United States Patent [19]

Hahn

[11] Patent Number: 4,920,598
[45] Date of Patent: May 1, 1990

[54] DOCK LEVELER WITH AUTOMATIC VEHICLE BARRIER

[75] Inventor: Norbert Hahn, South Milwaukee, Wis.

[73] Assignee: Rite-Hite Corporation, Milwaukee, Wis.

[21] Appl. No.: 257,425

[22] Filed: Oct. 13, 1988

[51] Int. Cl.$^5$ .............................................. E01D 1/00
[52] U.S. Cl. ..................................... 14/71.1; 14/71.3
[58] Field of Search ................... 14/69.5, 71.1, 71.3, 14/71.7; 414/537; 193/41; 254/89 H

[56] References Cited

U.S. PATENT DOCUMENTS

| | | | |
|---|---|---|---|
| 2,993,219 | 7/1961 | Pennington | 14/71.7 |
| 3,280,414 | 10/1966 | Layne | 14/71.3 |
| 3,424,323 | 1/1969 | Barnaby | 14/71.1 X |
| 3,486,181 | 12/1969 | Hecker et al. | 14/71.3 |
| 3,786,530 | 1/1974 | Le Clear | 14/71.3 |
| 3,872,948 | 3/1975 | Richards | 14/71.1 |
| 4,155,468 | 5/1979 | Royce | 14/71.3 X |
| 4,848,732 | 7/1989 | Rossato | 254/89 H X |

*Primary Examiner*—Jerome W. Massie, IV
*Assistant Examiner*—Matthew Smith
*Attorney, Agent, or Firm*—Neuman, Williams, Anderson & Olson

[57] ABSTRACT

A dock leveler is provided having an automatically actuated barrier for preventing accidental runoff of material handling equipment from a loading dock. The leveler includes a ramp pivotally mounted on the loading dock for selected movement from a stored position wherein the exposed upper surface of the ramp is level with the platform surface of the dock. A lip is hingedly connected to the front edge portion of the ramp and when in a depending first position supports the ramp in the stored position. When in the first position, a portion of the lip protrudes above the plane of the ramp upper surface and forms a vehicle barrier. Upon the ramp being actuated from the stored position to a raised position, the lip automatically slides relative to the ramp to a depending second position whereby no portion of the lip forms a protruding vehicle barrier. The lip is adapted to assume a cantilevered third position, when the ramp is in the raised position, thereby forming an extension of the ramp and spanning a gap forming between the front edge of the ramp and the rear end of the bed of a vehicle parked at the dock. When in the third position, no portion of the lip forms a protruding vehicle barrier.

11 Claims, 3 Drawing Sheets

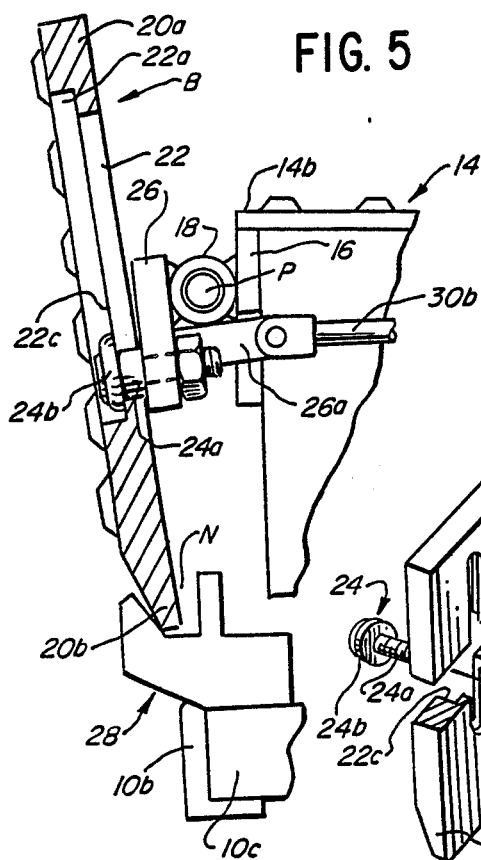
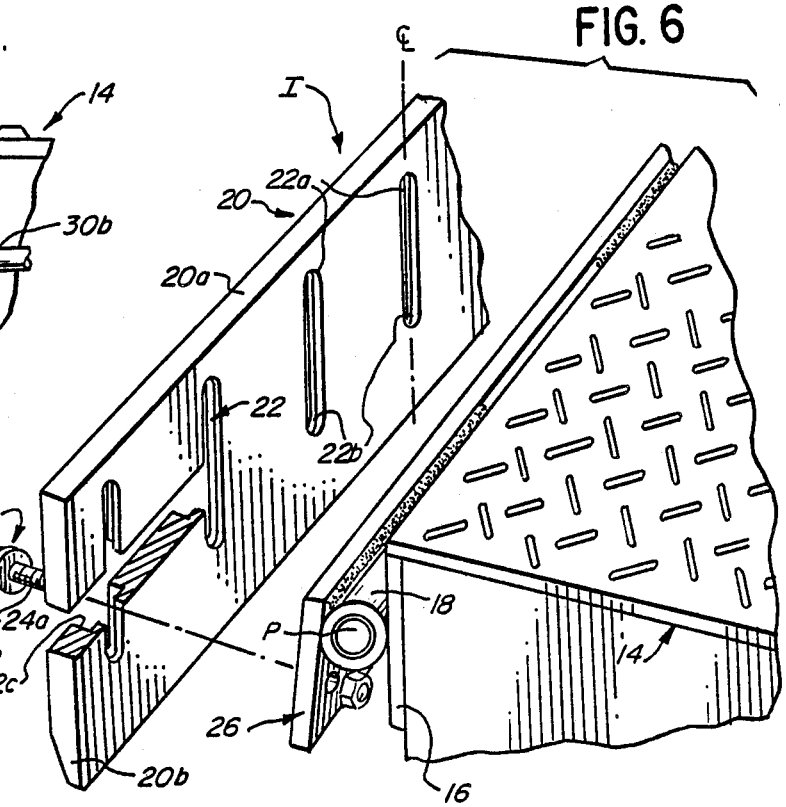
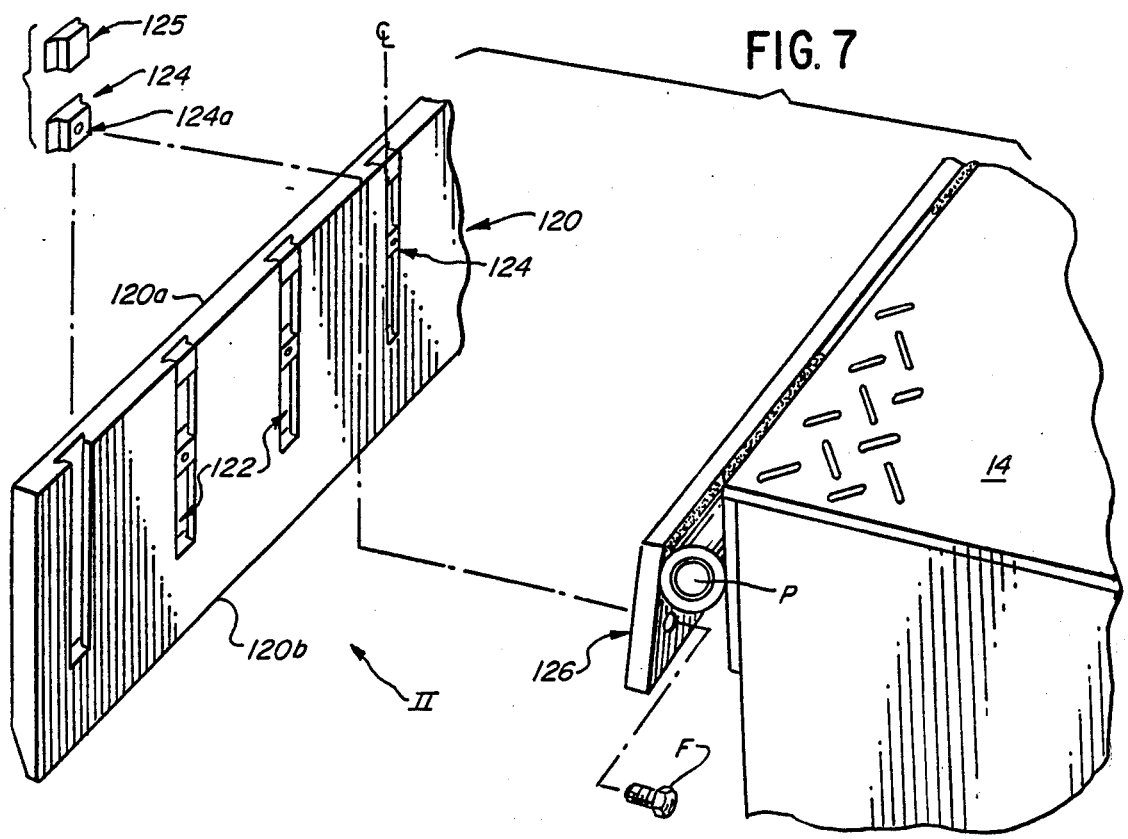

DOCK LEVELER WITH AUTOMATIC VEHICLE BARRIER

BACKGROUND OF THE INVENTION

This invention relates generally to loading dock leveler assemblies and more particularly to a dock leveler assembly which when in one mode automatically produces a barrier to prevent material handling equipment from accidentally running off the exposed front end of the dock.

Loading dock leveler assemblies are used widely to facilitate the loading and unloading of various sized vehicles parked adjacent to a loading dock platform. Examples of loading dock leveler assemblies are disclosed in U.S. Pat. Nos. 3,583,014, 3,699,601, 3,728,753, 4,110,860, 4,257,137, 4,531,248, and 4,570,277. Such levelers compensate for the height variations between the loading dock platform and the bed of the vehicle with a pivotally mounted loading ramp having an extension plate or lip pivotally mounted on the front edge portion of the loading ramp.

In the practical implementation of the use of such dock levelers certain safety problems may occur. Loading dock personnel may inadvertently drive or push fork lift trucks or related material handling equipment off the exposed front end of the loading dock leveler when there is no vehicle parked adjacent the loading dock and the dock leveler ramp is disposed in a stored position wherein the exposed surface of the ramp is level with the dock platform surface.

Dock levelers have heretofore been provided to minimize the risk of such accidental run off. Such dock levelers utilize a lip pivotally fixed to the front edge of the ramp. The pivot axis of the lip is set back a substantial distance from the rear edge of the lip so that the rear section of the lip between the pivotal axis and the lip rear edge will project above the ramp surface and form a barrier. When the lip is in an extended cantilevered position, the rear section of the lip would still project angularly to a varying degree above the loading ramp surface unless the ramp surface and the exposed surface of the lip were coplanar. Thus, the continued projection of the lip rear section might seriously obstruct the loading and unloading operations.

However, there are circumstances where it is desirable to provide an automatic barrier to handling equipment run off when the dock leveler assembly is in a stored neutral position while allowing the entire length of the barrier to depend below the loading ramp when the dock leveler is in other positions. Such circumstances include situations where material must be loaded onto or unloaded from the extreme rear of the bed of the vehicle parked adjacent the loading dock and the placement of the material interferes with the use of the dock leveler assembly with the lip in a fully extended position resting on the rear of the vehicle bed. It is also advantageous to avoid the pinching area developed in levelers which utilize a lip having a barrier forming rear section which overlaps under certain operating conditions the loading ramp since a potential for entrapping equipment or personnel exists in such levelers.

SUMMARY OF THE INVENTION

Thus, it is a general object of the present invention to provide an improved loading dock leveler which automatically raises a substantial barrier to prevent fork lift trucks and related material handling equipment from accidentally running off the front end of the loading ramp when the latter is in a stored position.

It is another object of the present invention to provide an improved loading dock leveler which is readily operable and has maximum safeguards for the safety of loading dock personnel and equipment.

It is a further object of the present invention to provide an improved loading dock leveler which allows loading and unloading operations involving the rear bed of a parked vehicle.

Further and additional objects and advantages will appear from the following description, accompanying drawings, and appended claims.

In accordance with one embodiment of the invention a dock leveler is provided having a ramp mounted on a loading dock for pivotal movement between a stored position wherein the exposed surface of the ramp is in a substantially horizontally plane, and an operative position relative to a parked vehicle. Hingedly connected to the front edge portion of the ramp is a lip which automatically assumes a depending storage position when the ramp is in the stored position. When the ramp and lip are in such position, a substantial peripheral portion of the lip projects above the exposed ramp surface and forms a barrier. When the ramp is moved from the stored position to the operative position, the lip plate automatically slides relative to the ramp in a plane substantially parallel to the lip hinge axis causing the barrier-forming peripheral portion of the lip to automatically assume a non-projecting position relative to the ramp exposed surface.

DETAILED DESCRIPTION OF THE DRAWINGS AND PREFERRED EMBODIMENTS

For a more complete understanding of the present invention reference should now be made to the accompanying drawings wherein FIG. 1 is a side elevational view in partial cross section of one embodiment of the improved dock leveler showing the ramp thereof in the stored position and the lip in the depending storage position whereby the upper peripheral edge portion of the lip forms a barrier.

FIG. 5 is an enlarged fragmentary vertical section view of a portion of the lip shown in a barrier-forming depending position.

FIG. 6 is an enlarged fragmentary perspective view of the lip of FIG. 1 in partial cross section and showing various components thereof in exploded relation.

FIG. 7 is similar to FIG. 6 but showing a second embodiment of the improved dock leveler.

Figure 1:
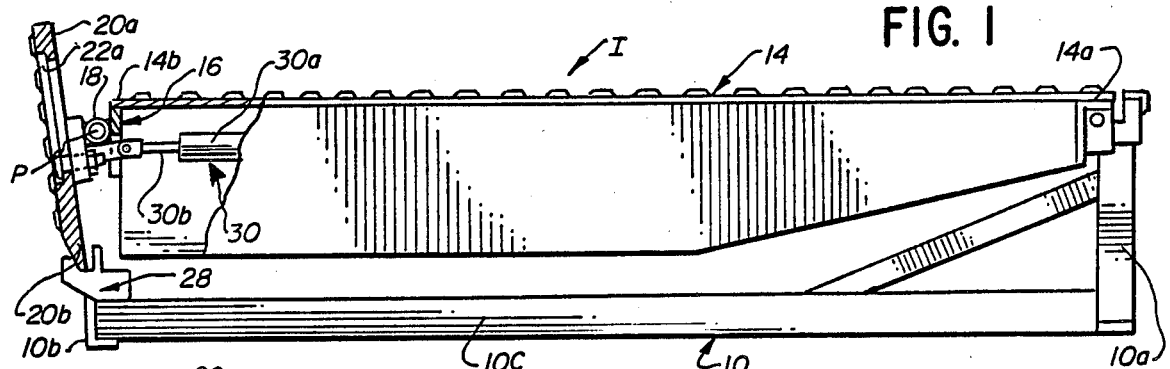

Referring now to the drawings and more particularly to FIG. 1 a preferred embodiment of the improved dock leveler assembly I is shown in a stored position or mode. The assembly includes a supporting frame 10 anchored within a pit, not shown, of conventional design formed in a loading dock and having an open top and an open side adjacent the front wall of the dock. An upright frame component 10a is positioned adjacent the rear wall of the pit and has pivotally connected to the upper end thereof the rear edge portion 14a of a loading ramp or dockboard 14. The ramp is substantially planar and is sized to conform substantially to the configuration of the pit open top so that when the leveler is in the stored position, the ramp will close the pit open top thereby allowing traffic to safely move over the pit. An elongate reinforcing header section 16 is mounted on and depends from the front edge 14b of the ramp 14. A row of axially spaced hinge tubular components 18 is affixed to the exterior front surface of the header section 16.

Figure 2:
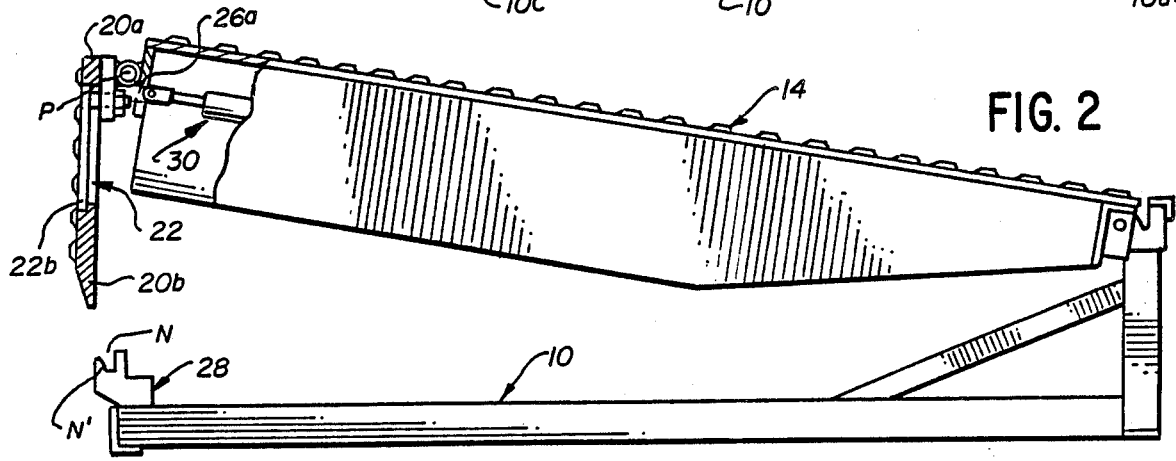
FIG. 2 is similar to FIG. 1 but showing the ramp in a raised position and the lip in a depending position.
Figure 3:
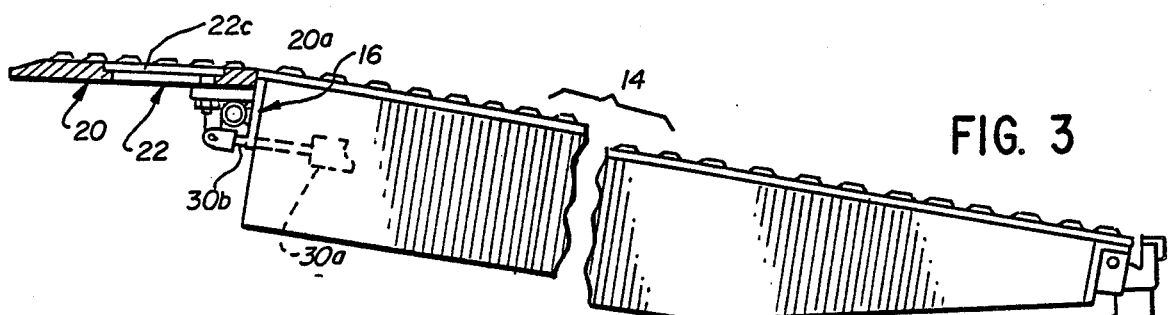
FIG. 3 is similar to FIG. 2 but showing the lip in an extended cantilevered position.

The loading ramp 14, when the leveler is in an inoperative mode, assumes a stored position of hinged adjustment, see FIG. 1, wherein the ramp exposed upper surface is substantially level and coplanar with the loading dock platform surface, not shown. When the dock leveler is actuated to an operative mode, the ramp 14 is pivoted to an initial raised position, as shown in FIGS. 2 and 3, and then pivoted downwardly to a position, which is compatible with the height of the bed of the vehicle parked at the loading dock. The mechanisms for affecting upward pivotal movement of the loading ramp is known to those skilled in the art and a description thereof is omitted as such mechanism forms no part of the invention herein disclosed.

The dock leveler assembly I includes a lip or extension plate 20 which is hingedly connected to the header section 16. The width of lip 20 is substantially equal to the width of the ramp front edge 14b. The lip is provided with a plurality of transversely extending laterally spaced, substantially parallel, slots 22. Extending through each slot 22 is the shank 24a of a stud bolt 24. The exposed end of each bolt is provided with an enlarged head 24b which, in turn, is accommodated in an exposed countersunk portion 22c of the slot 22. The depth of the countersunk portion 22c is equal to the axial thickness of the head 24b and the width of the countersunk portion 22c is slightly greater than a diametric dimension of the head. Thus, the bolt head is free to move longitudinally along the slot as the lip moves about its hinge axis, as will be described more fully hereinafter. Furthermore, the bolt head 24b will not protrude from the countersunk portion 22c of the slot and thus, create an obstruction to traffic moving across the lip plate when the latter is in an operative mode. The inner end of the stud bolt 24 is secured to an elongate hinge bar 26, which extends parallel to the hinge axis. The bar is provided with longitudinally spaced hinge tubular components which interfit with the tubular components 18 affixed to the ramp header section 16. The hinge tubular components are retained in aligned relation by a pivot pin P which extends therethrough.

Mounted on a cross support 10b, forming a part of the leveler frame 10, and disposed along the bottom of the pit, adjacent the dock front wall and spanning the distance between the side walls of the pit, is a pair of laterally spaced keeper brackets 28. The brackets protrude outwardly from the plane of the dock front wall and the upper surface of the protruding bracket portion is provided with a notch or pocket N which is sized to accommodate the lower elongate edge 20b of the lip when the latter is in the depending storage position, see FIG. 1. It will be noted that the lip lower edge 20b is chamfered on the exposed side thereof and coacts with a converging outer wall N' of the notch N and cams the lip lower edge slightly towards the notch inner wall whereby the lip edge is retained in the notch as the lip moves downwardly.

The lip edge 20b is disengaged from the notches of the keeper brackets upon the ramp 14 being pivoted upwardly from the stored position (FIG. 1). Upward pivotal movement of the ramp is normally accomplished by a spring or hydraulic force being exerted on the underside of the ramp in a manner well known in the dock leveler art. Once the ramp has been pivoted to its fully raised position (FIG. 2) the lip 20 may be actuated by a hydraulic piston/cylinder assembly 30 or other suitable mechanical or electro-mechanical means to an extended cantilevered position (FIG. 3). In the illustrated embodiment, the cylinder 30a of the assembly is mounted on the underside of ramp 14 near the ramp edge 14b. The piston 30b of the assembly has the exposed end thereof pivotally connected to a lug 26a which projects rearwardly from bar 26. When the piston is actuated to an extended position, the bar 26 and the lip 20 pivot as a unit about axis P to a cantilevered or extended position (FIG. 3) whereupon the ramp 14 and the extended lip 20 are subsequently pivoted downwardly as a unit about the pivotal connection between the ramp rear edge portion and the upper end of frame component 10a until the lip comes into overlying engagement with the bed of the parked vehicle.

As noted in FIG. 1 when the lip lower edge 20b is accommodated in the notches N of the keeper brackets 28, which occurs prior to ramp 14 having reached the horizontal or level position, the stud bolts 24 will each simultaneously move to a position adjacent the end 22b of the slots 22 as the ramp continues to move to the stored horizontal position. When this occurs, the portion of the lip, adjacent the lip edge 20a, will project a substantial distance above the plane of the ramp exposed surface thereby forming a barrier B adjacent the outer edge 14b of the ramp. The barrier B is of sufficient height to restrain material handling equipment (e.g., forklift trucks, carts and the like) from being accidently pushed off the free edge 14b of the ramp when the latter is in the stored position.

When the ramp 14 is actuated to its raised position (FIG. 2) the lip remains stationary until the stud bolts 24 have reached the upper ends 22a of the slots 22 at which time, the lip will move upwardly as a unit with ramp 14 until the latter reaches its fully raised position (FIG. 2). Due to the force of gravity the stud bolts will remain at the slot ends 22a until the lip edge 20b is once again accommodated in the keeper bracket notches N (see FIGS. 1 and 5). When the bolts 24 are disposed at slot ends 22a, the edge 20a of the lip 20 will not protrude above the plane of the ramp exposed surface even though the lip is in a depending position (FIG. 2).

A second embodiment of the improved dock leveler assembly II is illustrated in FIG. 7. The lip 120 has a plurality of wedge-shaped grooves 122 formed in the underside thereof in place of the afore-described slots 22 in lip 20. The grooves 122 do not extend through the lip 120 and thus, there are no exposed openings in the exposed upper surface of the lip. Complemental slide blocks 124 machined to slidably engage the grooves are provided and are secured to the bar 126 by threaded fasteners F. Tapped holes 124a may be formed in the slide blocks 124 to accommodate corresponding ends of the fasteners. End plugs 125 are welded in place at the top of the slide grooves 122 after the complemental slide blocks 124 have been positioned therein. When the slide blocks 124 are abutting the end plugs 125, the upper edge 120a of the lip is retracted and does not form the desired barrier. Thus, the barrier is formed only when the lip lower edge 120b is accommodated in the keeper bracket notches and the ramp 114 is in the stored horizontal position.

When lip 20 or 120 is in the extended cantilevered position and being moved to such position, there is no overlapping of the ramp exposed surface by any portion of the lip thus, avoiding the potential for entrapping personnel and loading equipment between the lip and ramp.

Figure 4:
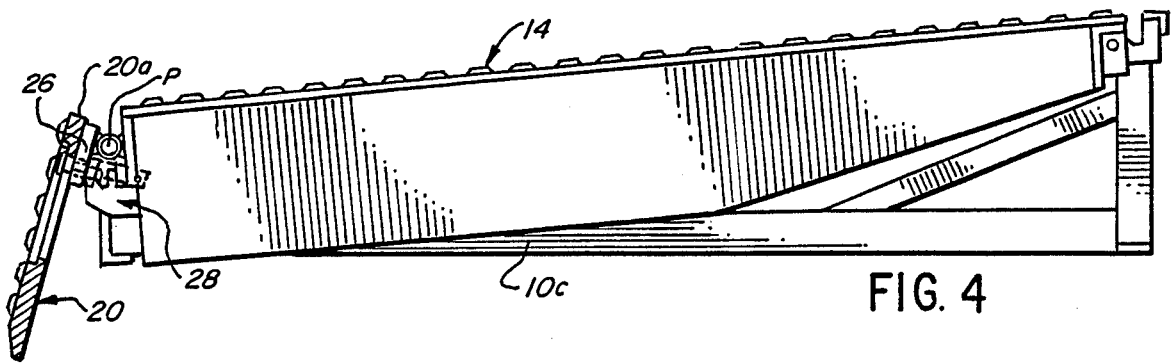
FIG. 4 is similar to FIG. 1 but showing the ramp in a below dock level position and the lip depending therefrom.

Referring to FIG. 4 it will be seen that the improved loading dock assembly I and assembly II, as well, allows loading and unloading of the rear portion of a vehicle bed when placement of the load on the bed would otherwise interfere with the use of the assembly when the lip thereof is in a fully extended position. For such loading and unloading operations, the dock leveler assembly is raised to the position shown in FIG. 2 so that the lip 20 or 120 will clear the keeper bracket notches and pivot outwardly enough so that lower edge 20b or 120b of the lip will slide past the brackets when the loading ramp 14 is lowered. Such a maneuver is common in many dock levelers presently on the market. As previously mentioned when the lip 20 or 120 is disengaged from the notches, the upper edge 20a or 120a of the lip will not protrude above the plane of the ramp exposed surface thereby allowing fork lift trucks and related material handling equipment to move unimpeded across the ramp front edge 14b while loading or unloading the rear bed portion of the parked vehicle.

Figure 8:
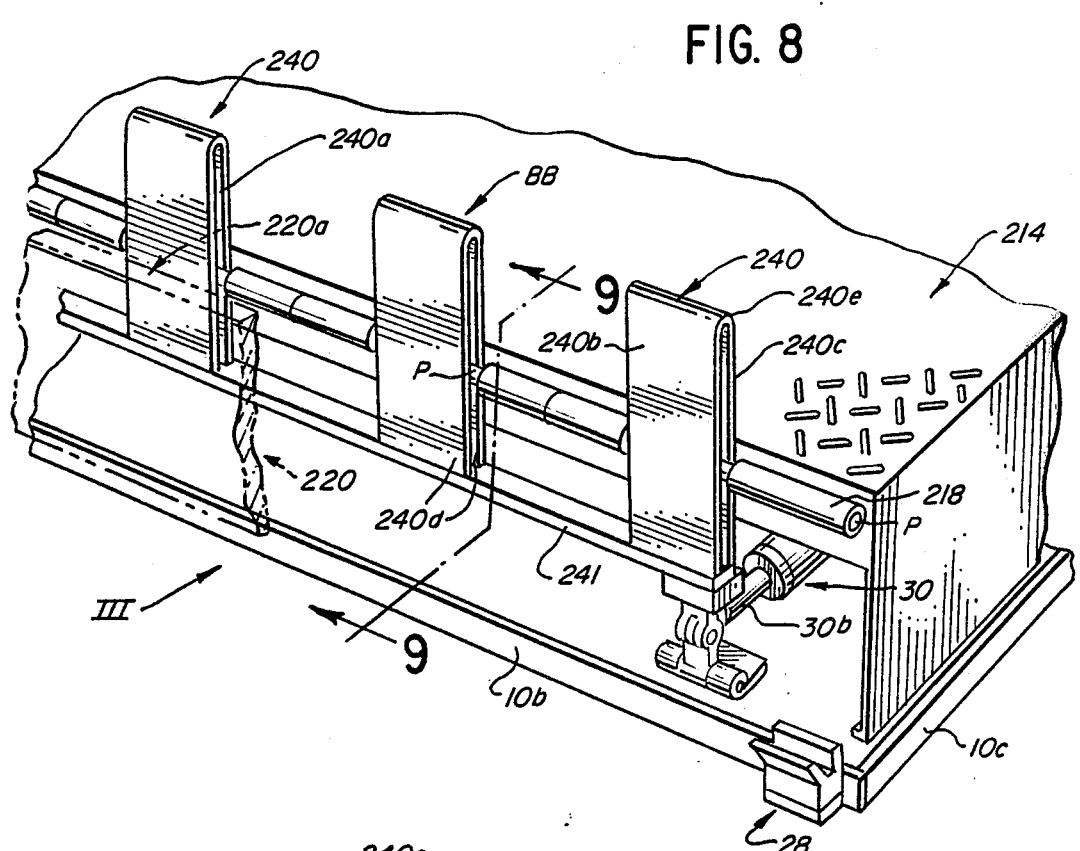
FIG. 8 is an enlarged fragmentary perspective view of a third embodiment of the improved dock leveler and showing the ramp thereof in a stored position and showing the lip in phantom lines in the depending storage position.
Figure 9:
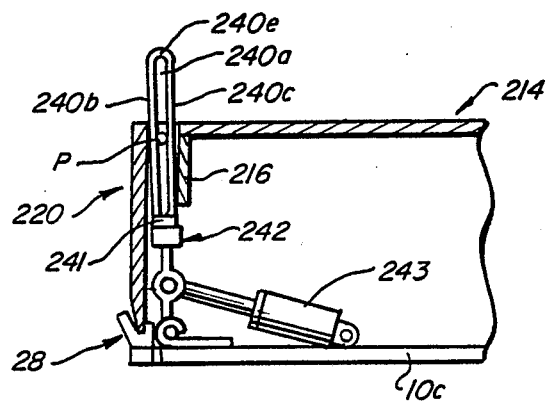
FIG. 9 is a fragmentary vertical sectional view taken along line 9—9 of FIG. 8.
Figure 10:
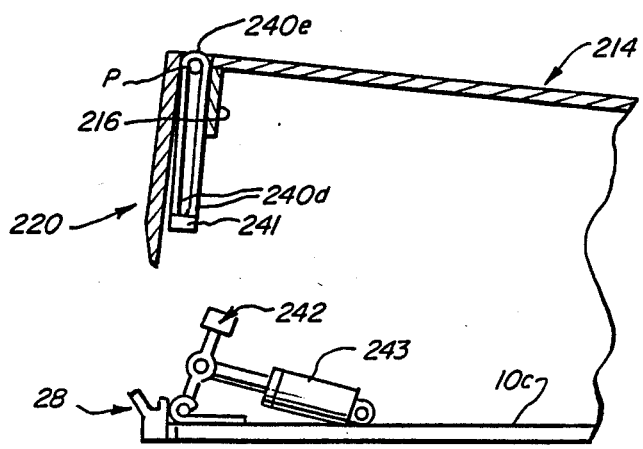
FIG. 10 is similar to FIG. 9 but showing the dock leveler ramp in a raised position and the lip in a depending position.

Another embodiment of an improved loading dock assembly III embodying the present invention is illustrated in FIGS. 8-10. The barrier BB in assembly III includes a row of laterally spaced inverted loop-shaped members 240 which are slidably connected between the header section 216 of the loading ramp 214 and the upper edge portion of lip 220. The members 240 straddle a hinge pin PP inserted through complimentary interfitting hinge tubular components 218 fixed to the header section 216 and the upper edge portion of the lip 220.

Each loop member 240 has an inner space 240a which is, approximately equal to but greater than the diameter of the hinge pin PP. The distance between the opposite exterior surfaces 240b,240c of each member 240 is approximately equal to but less than the outer diameter of the hinge components 218. The lower distal ends 240d of the members 240 are interconnected by a leg bar 241.

In the assembly III lip 220 has hinge tubular components affixed to the underside thereof in close proximity to the edge 220a of the lip. Thus, when the lip 220 is in the depending stored position, no portion of the lip protrudes above the ramp exposed surface. Instead, the leg bar 241 engages a stop 242 which in the illustrated embodiment is pivotally connected to a bottom component 10c of the frame 10. Pivotal adjustment of the stop may be effected by either a piston/cylinder unit 243 or a solenoid-actuated lever, not shown. When the ramp 214 and associated depending lip 220 are being pivoted as a unit to a stored position and storage position, respectively, the stop 242 is pivoted to an upright position (see FIG. 9) whereupon the leg bar 241 will abut the end of the upright stop 242. When this occurs the loop members 240 will remain stationary while the ramp and lip continue to pivot downwardly as a unit until the lip edge is accommodated by keeper bracket notches N. Thus, the loop members 240 and leg bar 241 slide as a unit independently between the header section 216 and the lip 220. The extent of the independent movement of the loop members 240 is limited by the distance between the leg bar 241 and the upper closed end 240e of each member 240. The inward pivotal movement of the members 240 is restricted by the depending header section 216.

The actuation of the stop to the upright position may be manually controlled by dock personnel through a control panel, not shown. The stop 242 automatically assumes an inoperative position (FIG. 10) when the ramp 214 is raised from the stored position (FIG. 9).

Thus, an improved dock leveler has been disclosed which is of simple, yet sturdy construction and automatically forms a safety barrier when the leveler is disposed in a stored mode, and automatically causes the barrier to disappear when the leveler is in an operative mode.

I claim:

1. A dock leveler assembly comprising a pivotally mounted loading ramp adjustable to a substantially horizontal stored position;
    barrier means operatively connected to said loading ramp for movement between a depending first position wherein a portion of said barrier means protrudes above a plane defined by an exposed surface of said loading ramp when the latter is in a substantially horizontal stored position and a depending second position wherein said ramp is in a non-stored position and no portion of said barrier means protrudes above said plane;
    retaining means for supporting said barrier means in said first position; and
    an attaching means for operatively connecting said barrier means to said loading ramp.

2. A dock leveler assembly as defined in claim 1 wherein said barrier means comprises a lip hingedly connected to said ramp and having a first connecting means; said attaching means having a second connecting means complemental to and in sliding engagement with said first connecting means.

3. A dock leveler assembly as defined in claim 2 wherein one of said connecting means includes an elongate slot means disposed transversely of the lip hinge axis, and the other connecting means has a portion thereof disposed within said slot means and movable longitudinally thereof.

4. A dock leveler assembly as defined in claim 3 wherein said slot means includes a plurality of elongate slots formed in and extending through said lip, said slots being disposed in laterally spaced substantially parallel relation.

5. A dock leveler assembly as defined in claim 4 wherein the attaching means includes the said other connecting means; the latter having a portion thereof accommodated within each slot, each accommodated portion being disposed proximate a corresponding end of a slot when said lip is in the depending second position.

6. A dock leveler assembly for a loading dock comprising a loading ramp having a first peripheral portion thereof pivotally mountable on the loading dock for adjustment between a stored position wherein an exposed upper surface of said ramp is adapted to be substantially level with the platform surface of the loading dock and a non-stored position;

barrier means pivotally and slidably attached to said loading ramp for movement between a depending first position wherein a substantial portion of said barrier means protrudes above a plane defined by said ramp exposed upper surface when said loading ramp is in said stored position and a depending second position wherein said substantial portion of said barrier means does not protrude above said plane;

and a retaining means mountable beneath said platform surface for supportingly engaging a second portion of said barrier means opposite said substantial portion when said barrier means is in said depending first position.

7. A dock leveler assembly as defined in claim 6 wherein said barrier means includes a lip having a first peripheral portion pivotally mounted on a second peripheral portion of the ramp, said ramp second peripheral portion being substantially opposite the ramp first peripheral portion, said lip being provided with a first connecting means slidably accommodating a complementary second connecting means pivotally connected to said ramp second peripheral portion.

8. A dock leveler assembly as defined in claim 7 wherein said first connecting means includes a plurality of spaced substantially parallel slots disposed transversely of the pivotal axis of the lip, and the second connecting means includes a plurality of studlike elements, each having a shank portion accommodated within a slot, said studlike elements projecting from an elongate member pivotally connected to the ramp second peripheral portion.

9. A dock leveler assembly as defined in claim 7 wherein said first connecting means includes a plurality of spaced substantially parallel grooves opening on a concealed surface of the lip, and said second connecting means includes a plurality of blocks, each being slidably accommodated in a groove and being impassable with respect to said groove opening; said blocks protruding from an elongate member pivotally connected to said ramp second peripheral portion.

10. A dock leveler assembly comprising
an undercarriage frame mountable within a pit formed in the platform surface of a loading dock;
a loading ramp pivotally connected at a rear edge to a rear portion of said undercarriage frame and adapted to normally assume a stored position wherein an exposed upper surface of said loading ramp is adapted to be substantially level with the dock platform surface, said ramp being moveable to a selected non-stored position;
a header section depending from a front edge of said loading ramp;
a barrier means including a slidable first means, and a lip operatively connected to said header section and first means for relative pivotal movement between a depending first position wherein said first means extends above the ramp upper surface when said ramp is in the stored position, a depending second position wherein the first means does not extend above the ramp upper surface when said ramp is in a non-stored position, and an extended cantilevered third position wherein said first means does not extend above the ramp upper surface and the lip forms an extension of said loading ramp when the latter is in a selected non-stored position;
keeper bracket means fixedly mounted on a front end portion of said frame for supporting said lip when in said depending first position; and
an attaching means slidably engaged by said first means for effecting the operative interconnection between said header section and said lip.

11. The dock leveler assembly as defined in claim 10 wherein the first means is disposed between a peripheral edge of said lip and said header section and is movable independently thereof between an upwardly extended barrier-forming position and a retracted non-barrier-forming position; and adjustable means mounted on said frame for effecting movement of said first means to the upwardly extended barrier-forming position.

* * * * *